Patented Jan. 8, 1935

1,987,059

UNITED STATES PATENT OFFICE 1,987,059

BLEACHING COMPOSITION

Gustav W. Goerner, Bourne, Mass.

No Drawing. Application May 31, 1933, Serial No. 673,769

2 Claims. (Cl. 23—6)

My invention relates to a new and useful bleaching composition whereby hydrogen peroxide may be readily obtained for technical and pharmaceutical uses by a safe and convenient method when sodium peroxide is employed.

An object of my invention is to provide a satisfactory form of adjustment of the hydrogen ion value of solutions formed when sodium peroxide is dissolved in water, thereby obtaining solutions of hydrogen peroxide particularly suited for the particular application at hand.

Another object of my invention is to prepare a safe, dry and efficient source of hydrogen peroxide for pharmaceutical or commercial purposes.

A further object of my invention is to convert the efficient sodium peroxide into a modification, practically free from the well known fire hazard characteristic of sodium peroxide, and thereby greatly improve the adaptability of the latter product.

It is a well known fact that in contact with water, sodium peroxide yields some caustic soda and hydrogen peroxide, accompanied by an energetic evolution of heat. An efficient yield, however, of hydrogen peroxide and atomic oxygen is attained in practice by neutralization with sulfuric acid, or actually acidifying the solution and restoring an alkaline reaction by alkalizing with some alkali salt of moderate pH. Glauber's salt of course is a by-product of such manipulation.

I have found that a fluosilicate, as for example, sodium silico fluoride, added to sodium peroxide in dry blend, in various proportions, results in a product which when added to water, will produce a hydrogen peroxide solution of any desired acidity or alkalinity. Furthermore, the blend is practically stable in closed containers under ordinary conditions of storage and shipping, and contact with water presents none of the dangerous aspects or ordinary sodium peroxide.

A dry blend of a silico fluoride and sodium peroxide may be compressed into tablets of various size for commercial or medicinal purposes.

The ratio of sodium peroxide to silico fluoride determines some of the properties of the resulting solution in water. For instance, a ratio of approximately 1.30 parts of silico fluoride to 1 part sodium peroxide (using commercial chemicals) will produce a hydrogen peroxide solution of faintly acid reaction and quite stable in the absence of oxidizable matter, but active and efficient in the presence of the latter. At pH 7 or slightly less, there may be a slight separation of silicon hydroxide, which however, if objectionable for any reason, may be eliminated by slight adjustment of the ratio of silico fluoride (downward), producing at slightly higher pH, a clear and more active solution.

Other pH and buffering adjustments are of course possible by the use of silicate of soda, borax, phosphates etc., in conjunction with the above mentioned combination.

In addition to the aforesaid properties, a solution of the described combination would possess the germicidal and insecticidal properties of the silico fluoride.

Having thus fully described my invention what I claim is

1. An improved dry stabilized bleaching composition for use with the addition of water, containing a mixture, in a dry physical state, of sodium peroxide and a soluble fluosilicate.

2. An improved dry stabilized bleaching composition, for use with the addition of water, containing a mixture, in a dry physical state, of sodium peroxide and sodium silico fluoride.

GUSTAV W. GOERNER.